April 8, 1958     J. B. BEACH     2,829,930
BEARING RETAINER
Filed Feb. 25, 1957
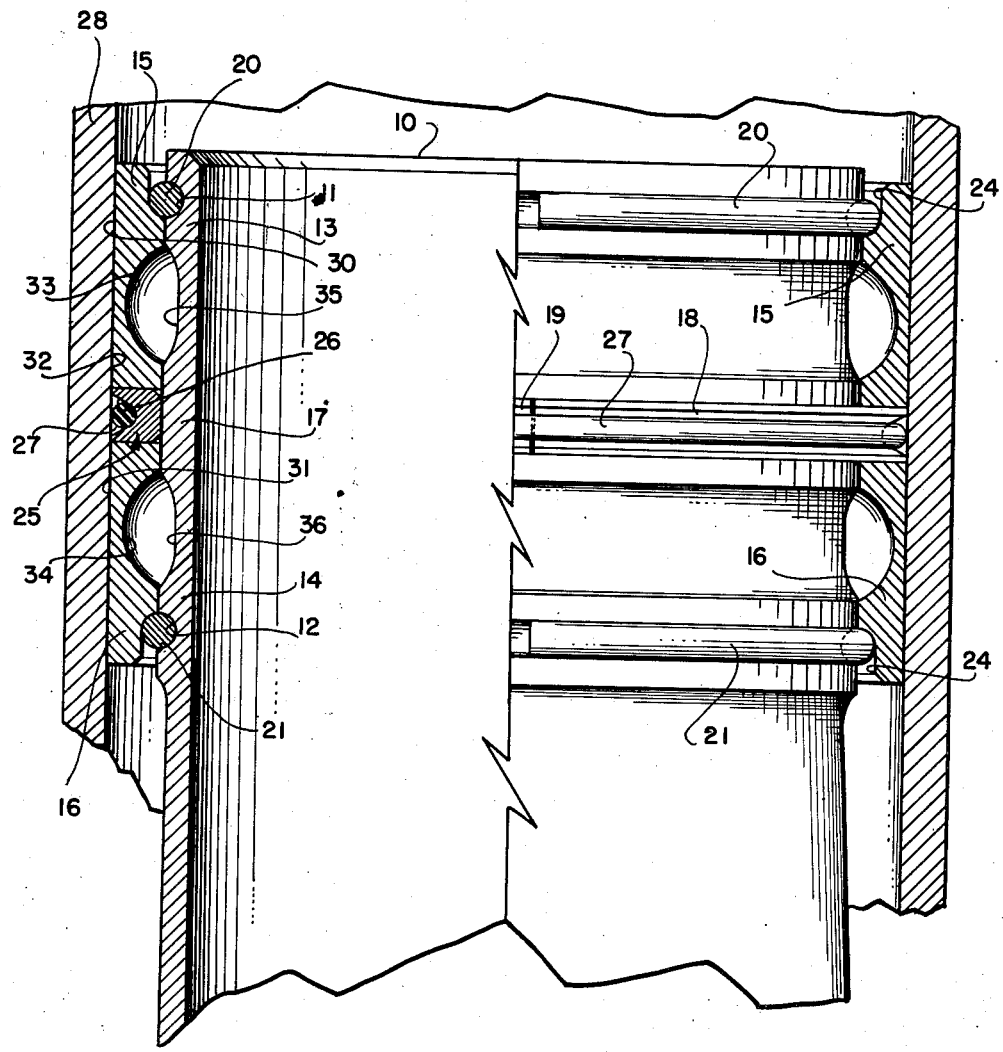
INVENTOR.
JAMES B. BEACH
BY
*George C. Sullivan*
Agent United States Patent Office 2,829,930
Patented Apr. 8, 1958

2,829,930

BEARING RETAINER

James B. Beach, Van Nuys, Calif., assignor to Lockheed Aircraft Corporation, Burbank, Calif.

Application February 25, 1927, Serial No. 642,014

5 Claims. (Cl. 308—4)

This invention relates to means for retaining a bearing on a structural member which is lightweight and improves the fatigue life of the structure.

In assemblies employing bearings of various types it is necessary to provide a means for securing the bearing to a structural member such as an axle, shaft or piston so that the bearing is firmly secured to the member and maintained in proper relation to other structure to which the bearing is intended to come into contact. For example, in the aircraft industry it is a common practice to employ sleeve bearings on the end of a piston which is inserted into a bore carried by a cylinder comprising a shock strut of the landing gear. Conventional practice has employed securing the bearings on the piston by means of external threads placed on the piston and internal threads placed on the bearing, threaded retaining collars, cross pins or bolts passing through both the bearing and the piston, and integral flanges on the piston between which diametrally split bearings are installed and held in place by installation in the cylinder.

Difficulties have been encountered when employing the above mentioned conventional practices which greatly affect weight, space and the life of the piston. Accordingly, the present invention provides a bearing retention means which does not employ sharp fillet radii common to threads or flanges and which greatly improves the fatigue life of the piston. A further feature resides in the fact that the bearing retainer of the present invention permits the bearings to freely rotate without danger of shearing pins or bolts.

In one embodiment of the present invention a piston is employed having a pair of grooves extending around the periphery of the piston. A pair of bearings are held in position between the pair of grooves by a pair of retaining rings which maintains the bearing on the piston. An insert ring is employed between the pair of bearings which urges the pair of bearings against the retaining rings. Since the retaining rings are immovably fixed to the piston, the bearings cannot slip or slide longitudinally on the piston.

It is an object of the present invention to provide a bearing retention assembly for securing a bearing to a structural member without the necessity of providing a sharp fillet radii common to threads or flanges. By the elimination of this necessity, the fatigue life of the structural member is greatly improved.

Another object of the present invention is to provide an economical and minimum weight and space retention arrangement for securing the bearing to a structural member.

Still a further object of the present invention is to provide a bearing retention assembly which permits the employment of full circle bearings rather than split bearings.

Another object of the present invention is to provide a bearing retention assembly which permits bearings to freely rotate without employing pins or bolts which may be subjected to shearing and breakage.

In order that the invention may be readily understood, reference will be made to the accompanying drawing, forming a part of this specification, and which is a central transverse section through a piston and associated parts in accordance with the present invention.

Referring to the drawing in detail, a piston 10 is shown provided with a pair of annular grooves 11 and 12 formed on thickened portions 13 and 14 of the piston. A pair of sleeve bearings 15 and 16 are carried by the upper portion of the piston adjacent thickened portions 13 and 14 and a third thickened portion 17. Preferably, the bearings are of the full circle type machined from aluminum bronze material, for example. It should be noted that the pair of bearings are not secured to the piston but are retained in position on the piston by means of a pair of resilient steel retaining rings 20 and 21 which are received into grooves 11 and 12 respectively and a rabbeted groove 24 provided in each bearing. Each retaining ring is split so that it may be readily slipped over the piston into engagement with their respective grooves. Retaining rings 20 and 21 are encompassed about ¾ of their periphery when properly installed by the piston and bearing so that the rings cannot inadvertently snap out of place.

Each bearing is held against its respective retaining ring by means of a split aluminum insert 25 comprising two semi-circular segments 18 and 19 separating the bearings. The insert is provided with an annular groove 26 which is adaptable to receive a resilient O-ring 27 which serves to retain the insert in position during assembly prior to the installation of the piston within a cylinder 28. Bearing surfaces 30 and 31 provided on each of the sleeve bearings come into contact with bore 32 of the cylinder.

Construction in this manner provides a bearing assembly and retention means for readily carrying loads in both the upward and downward direction which are due to frictional and pressure forces. Any load which tries to move the bearings axially relative to the piston are diverted through the retention rings into the piston.

In order to minimize weight of the bearing and retention assembly, recessed portions 33 and 34 are provided in each bearing and recessed portions 35 and 36 are provided on the piston separating thickened portions 13 and 17 and 17 and 14 respectively.

In actual assembly, retaining ring 21 is initially installed in the lower groove 12 carried by thickened portion 14 of piston 10. Then, lower bearing sleeve 16 is slipped over the top of the piston until the rabbeted groove 24 engages the lower retaining ring. At this time, the upper bearing sleeve 15 may be installed over the top of the piston and moved down to engage the lower bearing. After installation of the upper retaining ring 20 in groove 11 provided in thickened portion 13 of the piston, upper bearing sleeve 15 may be moved upward until its associated rabbeted groove 24 engages the upper retaining ring. In this condition, a space is provided between the upper and lower bearing sleeves and each segment of the split insert 25 may be slipped into position causing the separation of the pair of bearing sleeves. In order to prevent the segments of the insert from becoming disassembled during the installation of the piston into bore 32 of cylinder 28, a resilient O-ring 27 is installed in groove 26 carried by the insert to hold the insert in place. When the above has been accomplished, the piston including the bearings and retaining assembly may be inserted into bore 32 of cylinder 28 of a landing gear.

Having described only typical forms of the invention I do not wish to be limited to the specific details herein set forth, but wish to reserve to myself any variations

I claim:

1. A device of the character described wherein a member is inserted within the bore of a cylinder comprising, a pair of annular grooves disposed about the periphery of the member, a pair of bearings carried on the member between the pair of grooves, a retaining ring carried in each of the pair of grooves engageable with each bearing, and means separating one bearing from the other bearing maintaining the bearings against their associated retaining ring.

2. A device of the character described wherein a member is inserted within the bore of a cylinder comprising, a pair of annular grooves disposed about the periphery of the member, a pair of sleeve bearings carried on the member between the pair of grooves, a rabbeted groove provided on each sleeve bearing, a retaining ring carried in each of the pair of grooves engageable with the rabbeted groove of each bearing, and means separating one sleeve bearing from the other sleeve bearing urging the sleeve bearings against their associated retaining ring.

3. A device of the character described wherein a member is insertable into a bore provided in a cylinder comprising, a pair of thickened portions provided on one end of the member, an annular groove provided on each of the pair of thickened portions, a pair of bearings carried by the member between the pair of grooves, a retaining ring detachably assembled in each groove and associated with one of the pair of bearings, and means insertable between the pair of bearings maintaining each bearing in engagement with its associated retaining ring.

4. A device of the character described wherein a member is insertable into a bore provided in a cylinder comprising, a pair of thickened portions provided on one end of the member, an annular groove provided on each of the pair of thickened portions, a pair of bearings carried by the member between the pair of grooves, a retaining ring detachably connected to each groove and associated with one of the pair of bearings, a rabbeted groove provided in each bearing engageable with its associated retaining ring, and means insertable between the pair of bearings urging the rabbeted groove of each bearing into engagement with its associated retaining ring.

5. A device of the character described wherein a member is installed into a bore provided in a cylinder comprising, a pair of thickened portions provided on one end of the member, an annular groove provided on each of the pair of thickened portions, a pair of bearings carried by the member between the pair of grooves, a retaining ring detachably assembled in each groove and associated with one of the pair of bearings, a rabbeted groove provided in each bearing engageable with its associated retaining ring, a pair of inserts insertable between the pair of bearings maintaining each bearing in engagement with its associated retaining ring, and resilient means encircling the pair of inserts to keep the inserts in position prior to installation of the member into the cylinder bore.

References Cited in the file of this patent

UNITED STATES PATENTS 2,554,957     Riblet _____ May 29, 1951